Nov. 3, 1931.  G. A. MITCHELL  1,830,370
TRIPOD CLAMP
Filed July 7, 1930
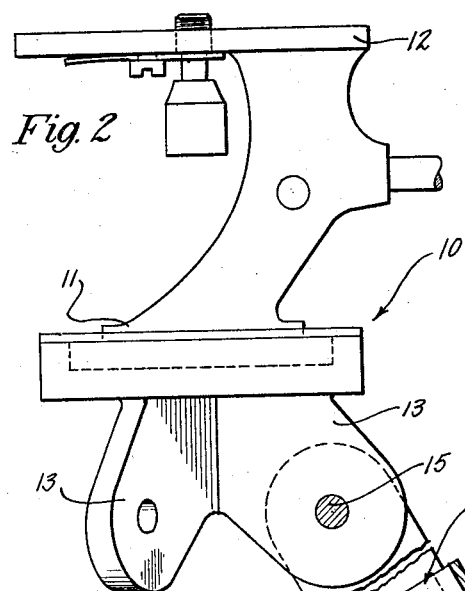
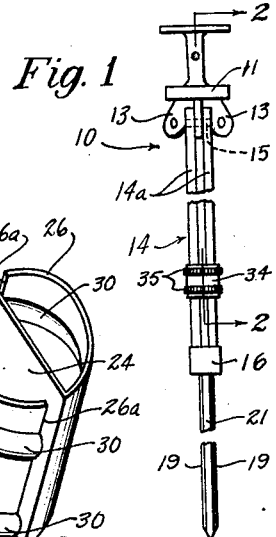
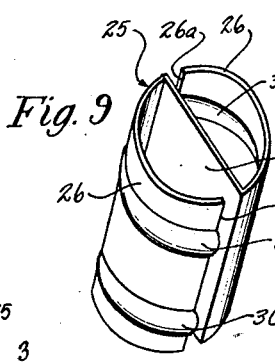
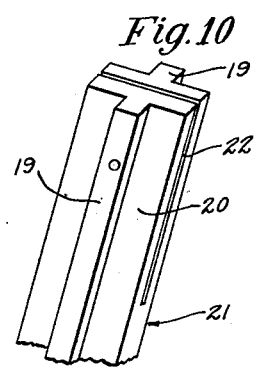
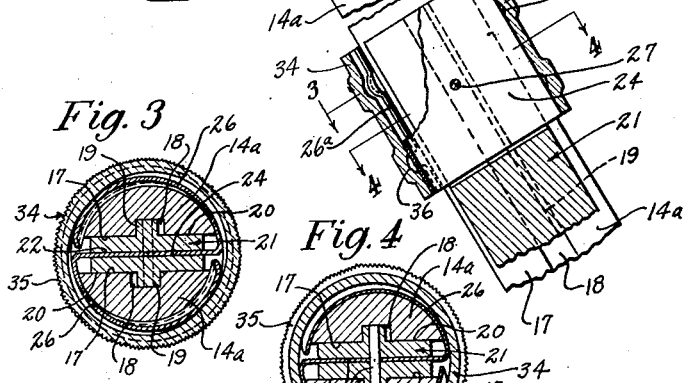
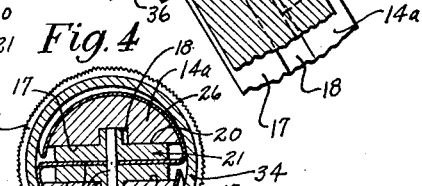
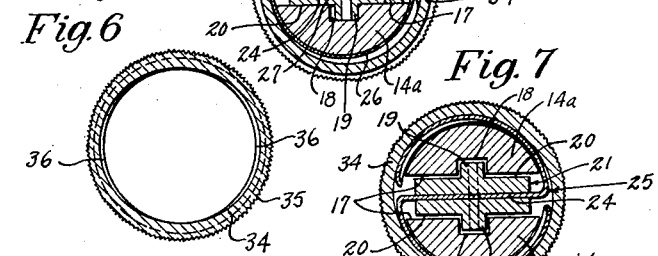
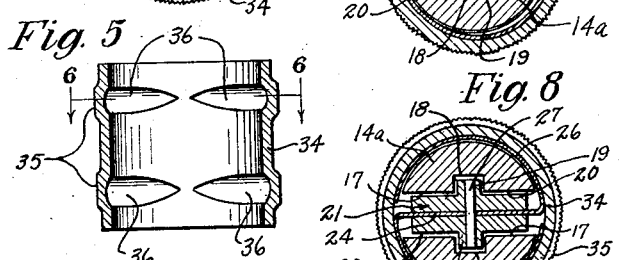
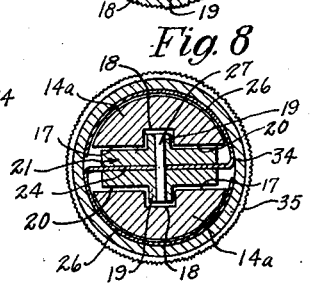
Inventor
George A. Mitchell.
Attorney.

Patented Nov. 3, 1931

1,830,370

UNITED STATES PATENT OFFICE

GEORGE A. MITCHELL, OF LOS ANGELES, CALIFORNIA

TRIPOD CLAMP

Application filed July 7, 1930. Serial No. 465,903.

This invention relates generally to tripods, and to clamps for telescoping tripod legs and like devices.

It is a general object of the present invention to provide a telescoping tripod-leg construction and a clamping device therefor which are simple in construction, inexpensive, and conveniently and quickly adjustable.

In accordance with the present invention each tripod leg is formed of an upper section comprising spaced sides pivoted at their upper ends to the tripod head, and connected at their lower ends by an encircling ferrule, and a lower section comprising a single leg confined and longitudinally slidable between the two sides of the upper section so as to telescope therewith. The upper leg-section assembly is cylindrical in external form, and surrounding the cylindrical assembly is a manually rotatable ring within which are camming elements adapted by virtue of rotation of the ring to exert radial pressure inward on the upper leg sections so as to clamp them tightly in assembly with the lower leg section. This construction results in a simple clamping device that is easily and quickly operated and is accordingly conducive to increased facility and speed in setting up or taking down the tripod.

The invention will be better understood from the following detailed description of a present preferred embodiment thereof, reference for this purpose being had to the accompanying drawings, in which:

Fig. 1 is a side elevation of a tripod provided with my improvements;

Fig. 2 is a view taken as indicated by line 2—2 of Fig. 1;

Fig. 3 is a transverse section taken on line 3—3 of Fig. 2;

Fig. 4 is a transverse section taken on line 4—4 of Fig. 2;

Fig. 5 is a central longitudinal section of the operating ring;

Fig. 6 is a section taken on line 6—6 of Fig. 5;

Fig. 7 is a section similar to Fig. 3, but showing the device in released position;

Fig. 8 is a view similar to Fig. 4, but showing the device in released position;

Fig. 9 is a perspective view of the cylindrical clamping member; and

Fig. 10 is a perspective view showing the upper end of the lower tripod leg section.

In the drawings, the numeral 10 designates generally a tripod having a rotatable head 11 supporting an instrument table 12, and having lugs 13 to which the upper ends of the spaced sides 14a of the upper leg sections 14 are pivoted, as indicated at 15. The two upper-leg-section sides 14a of each leg are provided with curved outer surfaces such that the upper leg section assembly is cylindrical in external form, and the two sides 14a of each leg are connected at their lower ends by an encircling ferrule 16. The inner opposed faces 17 of sides 14a are preferably formed with grooves 18 within which are slidably taken tongues 19 formed on the opposite faces 20 of the lower leg section 21. The leg sections are so fitted together that the lower leg section normally slides smoothly and easily between the upper leg sections, but the fit is preferably not so loose that the lower leg section will slide downwardly between the upper leg sections of its own weight when the clamping device is released. It is to be understood, however, that the cross sectional form of the leg sections here shown is but one illustrative form, and that any other form may be substituted, if desired.

In the preferred form, the upper end of the lower leg section 20 is cut with a slot 22 parallel to its faces 20, and taken within this slot is the middle or cross part 24 of a contractible cylindrical clamping element 25, each curved side 26 of which encircles one of the sides 14a of the upper leg section 14. A pin 27 fastens the cross part 24 of the clamping members 25 to the upper end of the lower leg section 21. This clamping element is preferably of resilient material and of the form illustrated, though it may be embodied in many other forms within the broad scope of the invention, as will be readily apparent to those skilled in the art. In the form illustrated, however, the clamping element is of relatively thin, resilient material, as spring brass. It is to be noted that the clamping element may be considered as a cylindrical member longitudinally split to be contractible and expansible, the cross part 24 serving simply as a connection with the lower leg section 20, and being here shown simply as forming a connecting part between the two curved sides 26 of the member.

Upper and lower cams 30 are pressed outwardly in the wall of each side 26 of the clamping member, the cams here shown tapering down from the side edges 26a around the sides of the member, as clearly shown in the drawings.

Carried around the contractible clamping member 25 is a relatively rotatable ring 34 having knurled raised portions 35 for convenience in gripping by the hand for operation of the device. The inner surface of this ring has, opposite the raised cams 30, cooperating semi-circular grooves 36, deepest at their middles and tapering out each way.

The normal diameter of the cylindrical clamping member relative to the operating ring 34 is such that when the parts are assembled and the ring 34 is rotated to such position that the cams 30 are directly opposite their respective cam grooves 36, the outer surfaces of the curved sides 26 of the clamping member are in full engagement with the inner surface of the ring 34, as shown in Fig. 8, while the cams 30 are taken within the cam grooves 36, as shown in Fig. 7. The parts are so proportioned that in this position the cylindrical clamp 25 passes loosely around the sides 14a of the upper leg sections, which therefore do not bind the lower leg section 20 tightly between them, and the lower leg section may be slid freely up or down for adjustment purposes.

Having adjusted the lower leg section for length, however, the ring 34 is gripped and rotated, which causes the cams and cam grooves to move relatively to each other, and thereby to force the cams inwardly relatively to the operating ring. And this, of course, causes the sides 26 of the cylindrical clamping member 25 to be moved radially inward toward engagement with the curved outer surfaces of the leg sections 14a, the operating ring being rotated to contract the cylindrical clamping member until its sides 26 are tightly engaged with the upper leg sections 14, when the lower leg section 20 becomes tightly bound therebetween. The parts are then in the position illustrated in Figs. 2, 3, and 4, it being noted that there is then a clearance between the walls of the curved sides 26 of the clamping member, while the highest points of the cams 30 are practically removed from the cam grooves, or are in only the shallow end parts thereof.

It will be noted from Figs. 3, 4, 7 and 8 that the two sides 14a of the upper leg section are shifted somewhat laterally in opposite directions by the contracting movement of the curved sides 26 of the clamping member. This movement is provided for by giving the tongues 19 clearance in the grooves 18, as clearly shown in the drawings.

Thus to adjust the legs of the tripod for length, the ring 34 is gripped and turned to release the clamp, and then moved to slide the lower leg section up or down to the desired position, after which another turn of the ring tightly clamps the leg sections in the adjusted position. And the amount of rotation required of the ring thus to clamp or unclamp the legs may be ninety degrees or less, so that a very simple movement serves quickly and easily to operate the clamp.

While I have now illustrated and described certain specific means for carrying out an embodiment of my invention, it will be obvious that various changes in design, structure and arrangement may be effected without departing from the spirit and scope of my invention; and it is therefore to be understood that all such changes are contemplated within the scope of my invention as expressed in the following claims.

I claim:—

1. In a device of the character described, the combination of overlapping members relatively longitudinally slidable, said members in assembly having a cylindrical external surface, a contractible member surrounding said cylindrical external surface, a ring surrounding said contractible member, and cooperating camming elements between said ring and contractible member adapted by virtue of rotation of said ring to contract said contractible member into engagement with said overlapping members.

2. In a device of the character described, the combination of overlapping members relatively longitudinally slidable, said members in assembly having a cylindrical external surface, a contractible member surrounding said cylindrical external surface and connected with one of said overlapping members, a ring surrounding said contractible member, and cooperating camming elements between said ring and contractible member adapted by virtue of rotation of said ring to contract said contractible member into engagement with said overlapping members.

3. In a device of the character described, the combination of overlapping members relatively longitudinally slidable, said members in assembly having a cylindrical external surface, a longitudinally split cylindrical member surrounding said cylindrical external surface and connected with one of said overlapping members, a ring surrounding said split cylindrical member, and cooperating camming elements between said ring and said split cylindrical member adapted by virtue of rotation of said ring to contract said contractible member into engagement with said overlapping members.

4. In a device of the character described, the combination of two spaced members overlapping a single member longitudinally slidable therebetween, said two spaced members in assembly having a cylindrical external surface, a contractible member surrounding said cylindrical external surface, a ring surrounding said contractible member, and cooperating camming elements between said ring and contractible member adapted by virtue of rotation of said ring to contract said contractible member into engagement with said overlapping members.

5. In a device of the character described, the combination of two spaced members overlapping a single member longitudinally slidable therebetween, said two spaced members in assembly having a cylindrical external surface, a contractible member surrounding said cylindrical external surface and connected with the overlapped end of said single member so as to be longitudinally movable with said single member on said spaced members, a ring surrounding said contractible member, and cooperating camming elements between said ring and contractible member adapted by virtue of rotation of said ring to contract said contractible member into engagement with said overlapping members.

6. In a device of the character described, the combination of two spaced members overlapping a single member longitudinally slidable therebetween, said two spaced members in assembly having a cylindrical external surface, a contractible clamping member having a longitudinally split cylindrical part surrounding said cylindrical external surface and having a part connected with the overlapped end of said single member, whereby said clamping member is longitudinally movable with said single member on said spaced members, a ring surrounding said split cylindrical member, and cooperating camming elements between said ring and said split cylindrical member adapted by virtue of rotation of said ring to contract said contractible member into engagement with said overlapping members.

7. In a device of the character described, the combination of two spaced members overlapping a single member longitudinally slidable therebetween, said two spaced members in assembly having a cylindrical external surface, a contractible clamping member having a longitudinally split cylindrical part surrounding said cylindrical external surface and having a part connected with the overlapped end of said single member, whereby said clamping member is longitudinally movable with said single member on said spaced members, an operating ring surrounding said contractible cylindrical member, an outwardly extending cam on said split cylindrical member, and there being a limited cooperating cam groove in the inner surface of said operating ring.

8. In a device of the character described, the combination of overlapping slidable members one within the other, a clamp member mounted on and carried by the inner member and having parts bearing on the exterior surface of the outer member, and means for operating the clamp member to clampingly engage the outer member.

9. In a device of the character described, the combination of overlapping slidable members one within the other, a clamp member mounted on and carried by the inner member and exteriorly surrounding the outer member, and rotatable means surrounding the clamp member and operative by rotation to cause the clamp member to grip the outer member.

In witness that I claim the foregoing I have hereunto subscribed my name this 20th day of May, 1930.

GEORGE A. MITCHELL.